(12) United States Patent
Ferguson et al.

(10) Patent No.: US 9,043,069 B1
(45) Date of Patent: May 26, 2015

(54) METHODS AND SYSTEMS FOR SCAN MATCHING APPROACHES FOR VEHICLE HEADING ESTIMATION

(71) Applicant: Google Inc., Mountain View, CA (US)

(72) Inventors: David I. Ferguson, San Francisco, CA (US); Donald Jason Burnette, Palo Alto, CA (US); Jiajun Zhu, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 105 days.

(21) Appl. No.: 13/670,917

(22) Filed: Nov. 7, 2012

(51) Int. Cl.
  *G06T 15/20* (2011.01)
  *G05D 1/00* (2006.01)
  *G01S 17/88* (2006.01)

(52) U.S. Cl.
  CPC .................................. *G05D 1/00* (2013.01)

(58) Field of Classification Search
  CPC ........... G05D 1/00; G05D 1/02; G05D 1/024; G05D 1/0251; G05D 1/10
  See application file for complete search history.

(56) References Cited

U.S. PATENT DOCUMENTS

| | | | |
|---|---|---|---|
| 6,608,913 B1 | 8/2003 | Hinton et al. | |
| 8,706,394 B2 * | 4/2014 | Trepagnier et al. | 701/301 |
| 2010/0106356 A1 * | 4/2010 | Trepagnier et al. | 701/25 |
| 2010/0121577 A1 | 5/2010 | Zhang et al. | |
| 2010/0274430 A1 | 10/2010 | Dolgov et al. | |
| 2012/0022739 A1 | 1/2012 | Zeng | |
| 2012/0035788 A1 * | 2/2012 | Trepagnier et al. | 701/3 |
| 2012/0101680 A1 * | 4/2012 | Trepagnier et al. | 701/26 |
| 2012/0109423 A1 * | 5/2012 | Pack et al. | 701/2 |
| 2012/0316725 A1 * | 12/2012 | Trepagnier et al. | 701/26 |
| 2013/0131908 A1 * | 5/2013 | Trepagnier et al. | 701/23 |
| 2013/0202197 A1 * | 8/2013 | Reeler et al. | 382/154 |
| 2014/0067187 A1 * | 3/2014 | Ferguson et al. | 701/28 |

* cited by examiner

*Primary Examiner* — James Trammell
*Assistant Examiner* — Demetra Smith-Stewart
(74) *Attorney, Agent, or Firm* — McDonnell Boehnen Hulbert & Berghoff LLP

(57) ABSTRACT

Methods and devices for estimating a heading of a target vehicle are disclosed. An example method may include determining a first point cloud representative of a location of a target vehicle at a first time period and a second point cloud representative of the location of the target vehicle at a second time period. Using a computing device, an initial comparison between the first point cloud and the second point cloud may be determined based on an estimate of a speed for the target vehicle and a time difference between the first time period and the second time period. Additionally, the initial comparison may be revised based on a minimization of a distance between points of the first point cloud and corresponding points of the second point cloud. An estimate of a heading of the target vehicle may then be determined based on the revised comparison.

20 Claims, 10 Drawing Sheets arctan(θ) = y/x

Computer Program Product 800

Signal Bearing Medium 802

Program Instructions 804

- determining a first point cloud representative of a location of a target vehicle at a first time period;

- determining a second point cloud representative of the location of the target vehicle at a second time period;

- determining an initial comparison between the first point cloud and the second point cloud based on an estimate of a speed for the target vehicle and a time difference between the first time period and the second time period;

- revising the initial comparison based on a minimization of a distance between points of the first point cloud and corresponding points of the second point cloud; and

- determining an estimate of a heading of the target vehicle based on the revised comparison.

| Computer Readable Medium 806 | Computer Recordable Medium 808 | Communications Medium 810 |

FIGURE 8

METHODS AND SYSTEMS FOR SCAN MATCHING APPROACHES FOR VEHICLE HEADING ESTIMATION

BACKGROUND

Some vehicles are configured to operate in an autonomous mode in which the vehicle navigates through an environment with little or no input from a driver. Such a vehicle may include one or more sensors that are configured to sense information about the environment. The vehicle may use the sensed information to navigate through the environment. For example, if an output of the sensors is indicative that the vehicle is approaching an obstacle, the vehicle may navigate around the obstacle.

In some instances, a vehicle may sense the presence of other vehicles and infer their behavior. Based on the inferred behavior, the vehicle may act accordingly. For instance, a vehicle may slow down or change lanes in response to detecting the presence of another moving vehicle. Various other examples are also possible.

SUMMARY

In one example aspect, a method is disclosed that includes determining a first point cloud representative of a location of a target vehicle at a first time period and determining a second point cloud representative of the location of the target vehicle at a second time period. The method may also include determining, using a computing device, an initial comparison between the first point cloud and the second point cloud based on an estimate of a speed for the target vehicle and a time difference between the first time period and the second time period. The method may further include revising, using the computing device, the initial comparison based on a minimization of a distance between points of the first point cloud and corresponding points of the second point cloud. According to the method, an estimate of a heading of the target vehicle may be determined using the computing device based on the revised comparison.

In another example aspect, a non-transitory computer-readable medium is disclosed having stored therein instructions executable by a computing device to cause the computing device to perform functions. The functions may include determining a first point cloud representative of a location of a target vehicle at a first time period and determining a second point cloud representative of the location of the target vehicle at a second time period. The functions may also include determining an initial comparison between the first point cloud and the second point cloud based on an estimate of a speed for the target vehicle and a time difference between the first time period and the second time period. The functions may further include revising the initial comparison based on a minimization of a distance between points of the first point cloud and corresponding points of the second point cloud. According to the functions, an estimate of a heading of the target vehicle may be determined based on the revised comparison.

In yet another example aspect, a controller is disclosed. The controller may include at least one processor, a memory, and instructions stored in the memory and executable by the at least on processor to cause the controller to perform functions. The functions may include determining a first point cloud representative of a location of a target vehicle at a first time period and determining a second point cloud representative of the location of the target vehicle at a second time period. The functions may also include determining an initial comparison between the first point cloud and the second point cloud based on an estimate of a speed for the target vehicle and a time difference between the first time period and the second time period. The functions may further include revising the initial comparison based on a minimization of a distance between points of the first point cloud and corresponding points of the second point cloud. According to the functions, an estimate of a heading of the target vehicle may be determined based on the revised comparison.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 8 is a schematic illustrating a conceptual partial view of an example computer program product that includes a computer program for executing a computer process on a computing device, arranged according to at least some embodiments presented herein.

DETAILED DESCRIPTION

Figure 1:
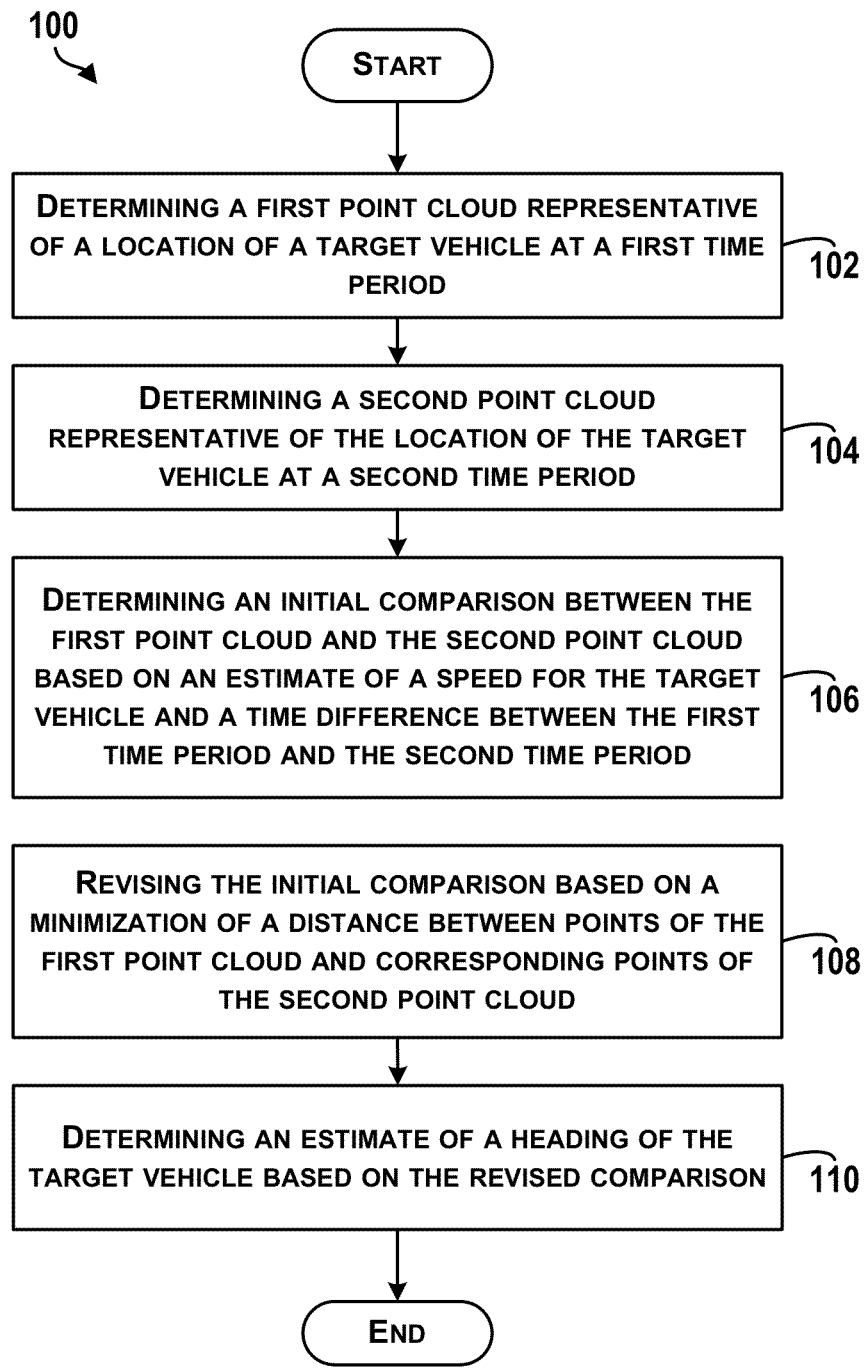
FIG. 1 is a block diagram of an example method of estimating a heading of a target vehicle.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure as generally describe herein, and illustrated in the figures, can be arranged, substituted, combined, separated, and designed in a wide variety of different configurations, all of which are explicitly contemplated herein.

In some instances, a vehicle, such as a vehicle configured to operate autonomously, may determine and make use of information about the real-time behavior of other vehicles. For example, an autonomous vehicle may be configured to detect the presence of other vehicles, infer their behavior, and react accordingly. According to some example described systems and methods, an estimate of a heading of another vehicle may be determined using a laser scan matching based approach.

As an example, an estimate of a heading (i.e., direction of travel) of another vehicle, herein referred to as a target vehicle, may be determined by comparing results of two laser scans of the target vehicle. For instance, a first laser scan may be performed to capture a first point cloud representing the target at a first time period (or instance in time) while a second laser scan may subsequently be performed (perhaps milliseconds later) to capture a second point cloud representing the target vehicle. By determining a transformation or comparison of the first point cloud that "fits" the first point cloud onto the second point cloud, an estimate of a change in location and motion of the target vehicle may be inferred.

In one example, the transformation may be determined using a modified version of an iterative closest point (ICP) algorithm. According to the modified version, an estimate of the speed, and optionally the heading, of the target vehicle may be used to predict an initial guess for the transformation. Given the estimate for the speed of the target vehicle (determined using a Doppler speed radar, e.g.) and the time difference between the capture of the first point cloud and the capture of the second point cloud, an estimate of the change in location between the first point cloud and the second point cloud may be found. The change in location may then be used as the initial guess for the ICP algorithm. After the ICP algorithm converges and yields a revised transformation between the first point cloud and the second point cloud, an estimate of the heading of the target vehicle may be found by determining the inverse tangent of the revised transformation along the ground plane, for example.

In some instances, additional functions may be performed to improve the efficiency of the ICP algorithm. For instance, points of a point cloud that are outside of a predetermined height range above the ground plane may be removed such that a strip of points that is likely to represent the side, front, and/or rear of the target vehicle remains. Additionally, the density of the point clouds may be limited to increase the convergence speed of the ICP algorithm.

Although examples herein are described with respect to a vehicle that is configured to operate autonomously, the examples are not meant to be limiting. In other instances, a computing device (e.g., a computing device that is on-board a vehicle or a computing device in a server) may be configured to determine an estimate of a heading of a target vehicle and provide the estimate to another device, such as a driver assistance system. Subsequently, the estimate of the heading of the target vehicle may be used by the another device to perform one or more functions.

Referring now the Figures, FIG. 1 is a block diagram of an example method 100 of estimating a heading of a target vehicle. Method 100 shown in FIG. 1 presents an embodiment of a method that could be used with the vehicles described herein, for example, and may be performed by a vehicle or components of a vehicle, or more generally by a server or other computing device. Method 100 may include one or more operations, functions, or actions as illustrated by one or more of blocks 102-110. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 100 and other processes and methods disclosed herein, the block diagram shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer-readable medium, such as, for example, a storage device including a disk or hard drive. The computer-readable medium may include a non-transitory computer-readable medium, for example, such as computer-readable media that store data for short periods of time like register memory, processor cache, and Random Access Memory (RAM). The computer-readable medium may also include non-transitory media, such as secondary or persistent long term storage, like read only memory (ROM), optical or magnetic disks, and compact-disc read only memory (CD-ROM), for example. The computer-readable media may also be any other volatile or non-volatile storage systems. The computer-readable medium may be considered a computer-readable storage medium, a tangible storage device, or other article of manufacture, for example.

In addition, for the method 100 and other processes and methods disclosed herein, each block may represent circuitry that is configured to perform the specific logical functions in the process.

As shown, initially, at block 102, the method 100 includes determining a first point cloud representative of a location of a target vehicle at a first time period. Additionally, at block 104, the method 100 includes determining a second point cloud representative of the location of the target vehicle at a second time period.

In one example, an autonomous vehicle may be equipped with a three-dimensional (3D) scanning device (e.g., a 3D laser scanner) that may be configured to determine distances to surfaces of objects in an environment. In one instance, the 3D laser scanner may be an active scanner that uses laser light to probe a surface. For example, the 3D laser scanner may take the form of a time-of-flight laser rangefinder or light detection and ranging (LIDAR) system that finds the distance to a surface by timing the round-trip time of a pulse of light. A laser may emit a pulse of light and the amount of time before the reflected light is detected by a detector may be timed. Given the speed of light and the determined amount of time, a distance to a surface that the emitted light reflected off of may be calculated.

Additionally, a view direction of the laser rangefinder or LIDAR system may be changed by rotating the laser rangefinder itself or by using a system of rotating mirrors. For example, the laser rangefinder or LIDAR system may be configured to rotationally scan an environment at a fixed time interval. In one instance, the view direction of the laser rangefinder or LIDAR system may be configured to rotate such that one rotational scan (i.e., a 360 degree scan of an environment) lasts 100 milliseconds. Other example rotational speeds and configurations are also possible.

A laser scan may yield a collection of points in space, referred to herein as a point cloud. Each point of the point cloud may represent a distance to a surface of an object in the environment. In one example, an object detection system of the autonomous vehicle may be configured to identify a cluster within a point cloud as an object. The object detection system may then take into account a variety of sensor data, in addition to the point cloud data, to classify the object as a certain type of object. For instance, the object detection system may receive data from lasers, sonar, radar, cameras, and other devices which can scan and record data from a vehicle's surroundings. The object detection system may then consider one or more indications such as a point cloud density, surface normal distribution, object height, object radius, camera image color, object shape, object moving speed, or other indications associated with the object to determine the type of object. In one example, based on the indications, a machine learning algorithm may be used to classify the type of object. For example, the machine learning algorithm may include various decision trees.

In one example, a first point cloud captured at a first time period or first instance in time may be identified as a target vehicle (e.g., a car, truck, or other vehicle in a surrounding environment of the autonomous vehicle). After a subsequent scan, for instance a scan occurring after a fixed time interval, if a second point cloud captured during the subsequent scan is identified as the same target vehicle, then the first point cloud may be "fit" onto or aligned with the second point cloud. Note that if the first point cloud and the second point cloud represent the same field of view of the target vehicle and are defined with respect to the same 3D coordinate system, a change in location, and thus motion, of the target vehicle during the fixed time interval may be inferred based on a transformation required to align the first point cloud with the second point cloud.

At block 106, the method 100 includes determining an initial comparison between the first point cloud and the second point cloud based on an estimate of a speed for the target vehicle and a time difference between the first time period and the second time period. In one instance, an estimate of a speed of the target vehicle may be determined using a Doppler radar. For example, the estimate of the speed may be a relative speed that is determined with respect to the speed of the autonomous vehicle or an absolute speed of the target vehicle. Given the time difference between the first time period and the second time period as well as the estimate of the speed, an estimate of the change in location of the target vehicle between the first time period and the second time period may be determined. For example, the change in location may be calculated by multiplying the time difference by the estimate of the relative speed of the target vehicle. As an example, if the time difference is a fixed interval at which a laser scan is performed such as 100 milliseconds and the estimate of the relative speed of the target vehicle is 10 meters/second, the change in location may be determined to be 1 meter.

Continuing with the example, if the change in location of the target vehicle is estimated as 1 meter, the initial comparison may be a transformation that translates the first point cloud by 1 meter in the direction of the second point cloud. As a simple example, the initial comparison may translate the first point cloud by one meter along a vector that is defined between a center of the first point cloud and a center of the second point cloud.

In a further example, because the autonomous vehicle may be tracking the target vehicle over time, if a previous estimate of a heading of the target vehicle is available, the previous estimate of the heading of the target vehicle may also be used to determine the initial comparison. Continuing with the above example, the first point cloud may be translated by 1 meter in the direction of the previous estimate of the heading of the target vehicle.

After determining the initial comparison, a computing device of the autonomous vehicle may be used to further revise the initial comparison to a more precise solution. At block 108, the method 100 includes revising the initial comparison based on a minimization of a distance between the points of the first point cloud and corresponding points of the second point cloud. In one example, an ICP algorithm may be used to iteratively shift an initial transformation until point to point correspondences between the first point cloud and the second point cloud converge to a minimum. Briefly, the ICP algorithm may associate points of the first point cloud with points of the second point cloud by a nearest neighbor criteria, determine an overall distance between the associated points, estimate a revised transformation that decreases the overall distance, transform the first point cloud using the revised transformation, and iterate the process again until the overall distance falls below a predetermined threshold. Further description of an example ICP algorithm is described below with respect to FIG. 4.

At block 110, the method 100 includes determining an estimate of a heading of the target vehicle based on the revised comparison. In one example, the revised comparison may be or include an offset between the initial location of the first point cloud and the second point cloud. For example, the offset may be defined in the form of a 3D vector between the location of the first point cloud and the second point cloud. Additionally, the 3D vector may be defined with respect to a 3D coordinate system of the autonomous vehicle. If the 3D coordinate system is oriented such that an x-axis and a y-axis span a ground plane of the autonomous vehicle or target vehicle (e.g., a road the autonomous vehicle and the target vehicle are traveling on) and a z-axis is oriented perpendicular to the ground plane, an estimate of the heading of the target vehicle may be determined based on the x and y components of the 3D vector. Specifically, if the x-axis is aligned with respect to the direction of travel of the autonomous vehicle, the estimate of the heading of the target vehicle may be determined based on an inverse tangent of the 3D vector along the ground plane.

In a further example, the method 100 may also include controlling the autonomous vehicle in the autonomous mode based on the estimate of the heading. For example, the estimate of the heading may be provided to a tracking system of the autonomous vehicle that is configured to determine future predictions about the behavior of the target vehicle.

An example implementation of the method 100 is described below in connection with FIGS. 2A-3E. It is to be understood, however, that the example implementation is illustrative only and is not meant to limiting. Other example implementations are possible as well.

Figure 2A:
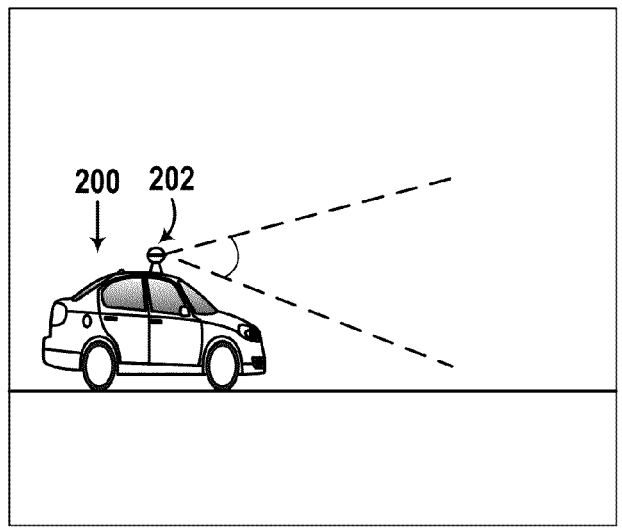
FIGS. 2A-2B are example conceptual illustrations of a vehicle performing a laser scan of an environment.
Figure 2B:
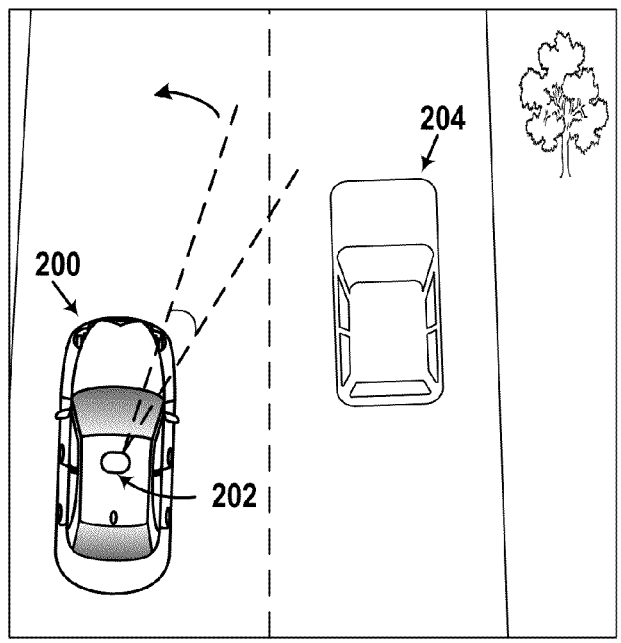

FIGS. 2A-2B are example conceptual illustrations of a vehicle 200 performing a laser scan of an environment. In one example, the vehicle 200 may be a vehicle that is configured to operate in an autonomous mode. As shown in FIGS. 2A and 2B, the vehicle 200 may include a laser scanner that is configured to scan an environment. In one instance, the vehicle 200 may include a laser scanner 202 mounted on the roof of the vehicle 200. Optionally, the laser scanner 202 may be mounted at another convenient location of the vehicle 200 (not shown).

The laser scanner 202 may be configured to measure distances between the vehicle 200 and surfaces of other objects. For instance, the laser scanner may be configured to measure distances to surfaces that are facing the vehicle. In one example, the laser scanner 202 may spin on its axis and/or change its pitch to scan the environment. As shown in FIG. 2B, in one example, the laser scanner 202 may determine distances to surfaces of a target vehicle 204. In other instances, the laser scanner 202 may determine distances to multiple target vehicles (not shown).

Figure 3A:
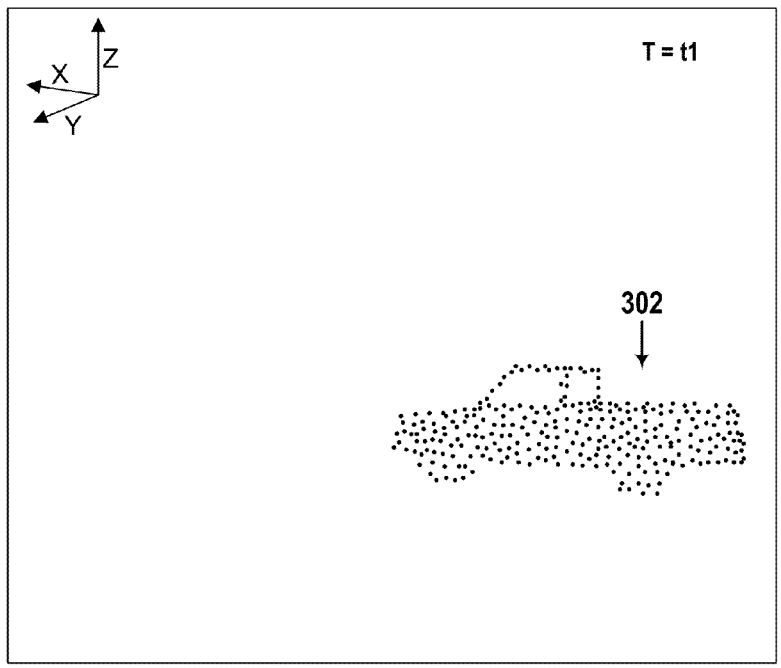
FIGS. 3A-3E are example conceptual illustrations of a scan matching approach to estimating a heading of a target vehicle.
Figure 3B:
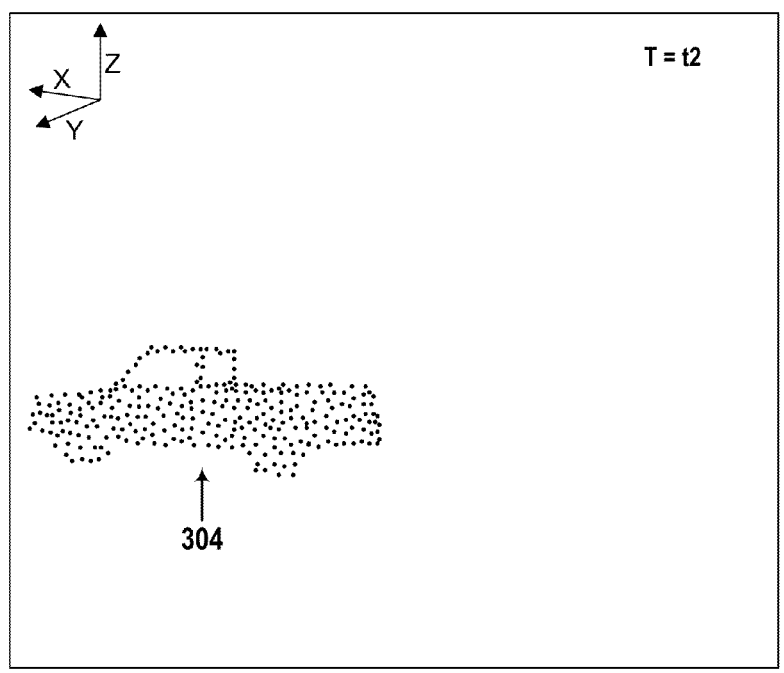

FIGS. 3A-3E are example conceptual illustrations of a scan matching approach to estimating a heading of a target vehicle. As shown in FIG. 3A, a first point cloud 302 captured at a first time period and representing a location of a target vehicle at the first time period may be identified. In one example, the target vehicle may be a pickup truck. Additionally, as shown in FIG. 3B, a second point cloud 304 captured at a second time period and representing a location of the same target vehicle at the second time period may also be identified. Each of the first point cloud and the second point cloud 304 may be defined with respect to a common 3D coordinate system. For example, the origin of the 3D coordinate system may be the position of the vehicle having the laser scanner. Further, the x-y plane of the 3D coordinate system may be aligned with a road that the vehicle is traveling along. Also, the x-axis of the 3D coordinate system may be aligned with a direction of travel of the vehicle.

Figure 3C:
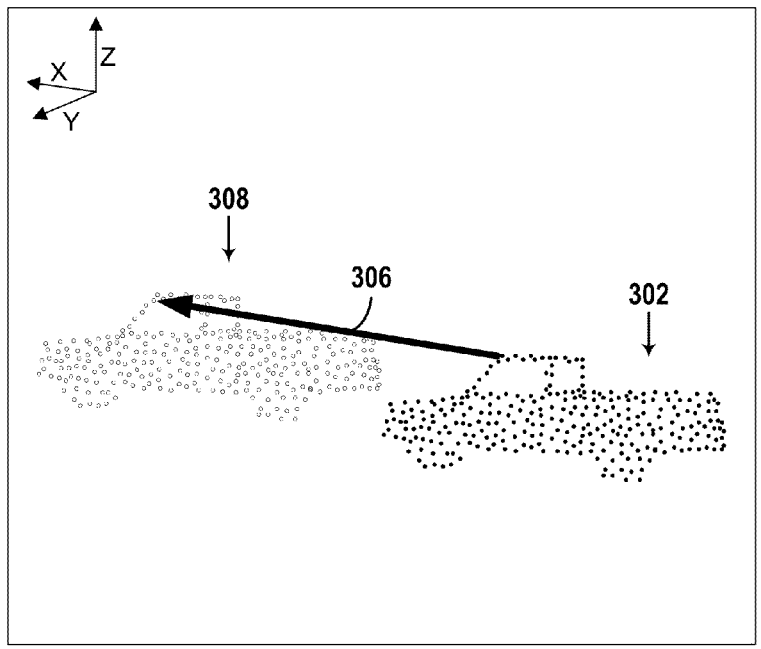

As shown in FIG. 3C, an initial transformation 306 that is determined based on an estimate of a speed of the target vehicle and a time difference between the first time period and the second time period may be used to transform the first point cloud 302. Based on the initial transformation 306, an initial transformed point cloud 308 may be determined. For example, the initial transformed point cloud 308 may be found by transforming each point of the first point cloud 302 to a new position based on the initial transformation 306.

Figure 3D:
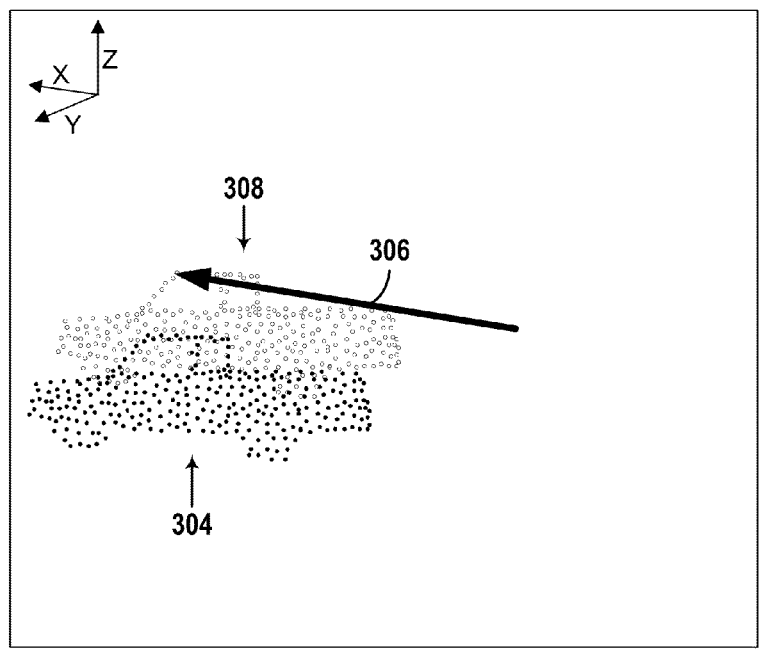

As shown in FIG. 3D, the initial transformed point cloud 308 may be an initial guess of an alignment of the first point cloud 302 with the second point cloud 304. Given the initial transformed point cloud 308 and initial transformation 306, an ICP point algorithm may be used to determine a revised transformation that more closely aligns the first point cloud 302 with the second point cloud 304.

Figure 3E:
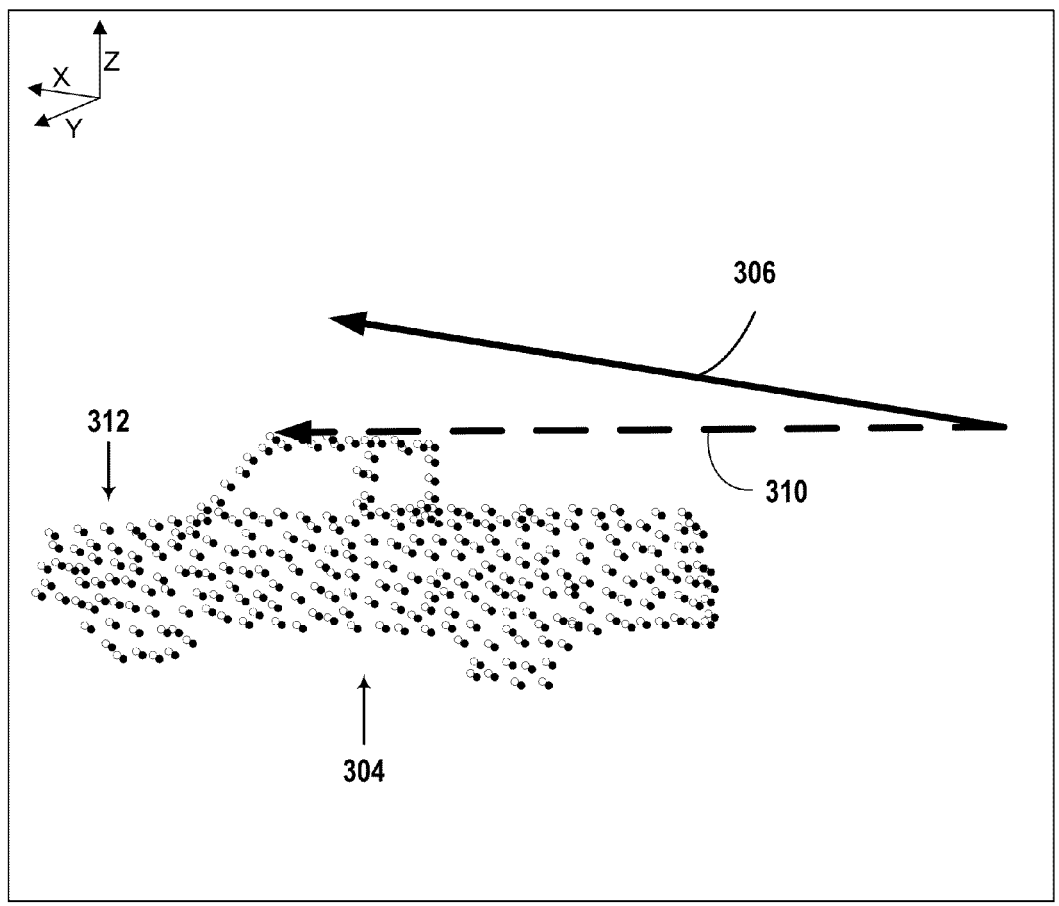
Figure 3E:
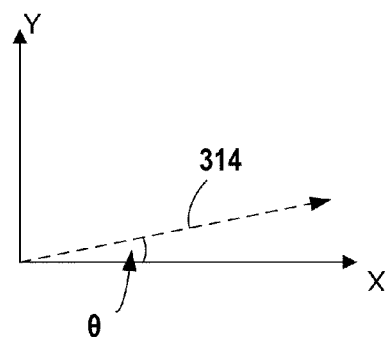

As shown in FIG. 3E, the ICP algorithm may output a revised transformation 310 and corresponding revised transformed point cloud 312. The revised transformation 310 may be an offset between the first point cloud 302 and the revised transformed point cloud 312 in the form of a 3D vector that is defined with respect to the 3D coordinate system. Subsequently, a projection 314 of the revised transformation 310 along the x-y plane (e.g., a ground plane) of the 3D coordinate system may be determined. Based on the projection 314, an estimate of the heading of the target vehicle may be determined by calculating an inverse tangent of the projection 314. Thus, an estimate of the heading of the target vehicle with respect to a direction of travel of the vehicle having the laser scanner may be determined.

Figure 4:
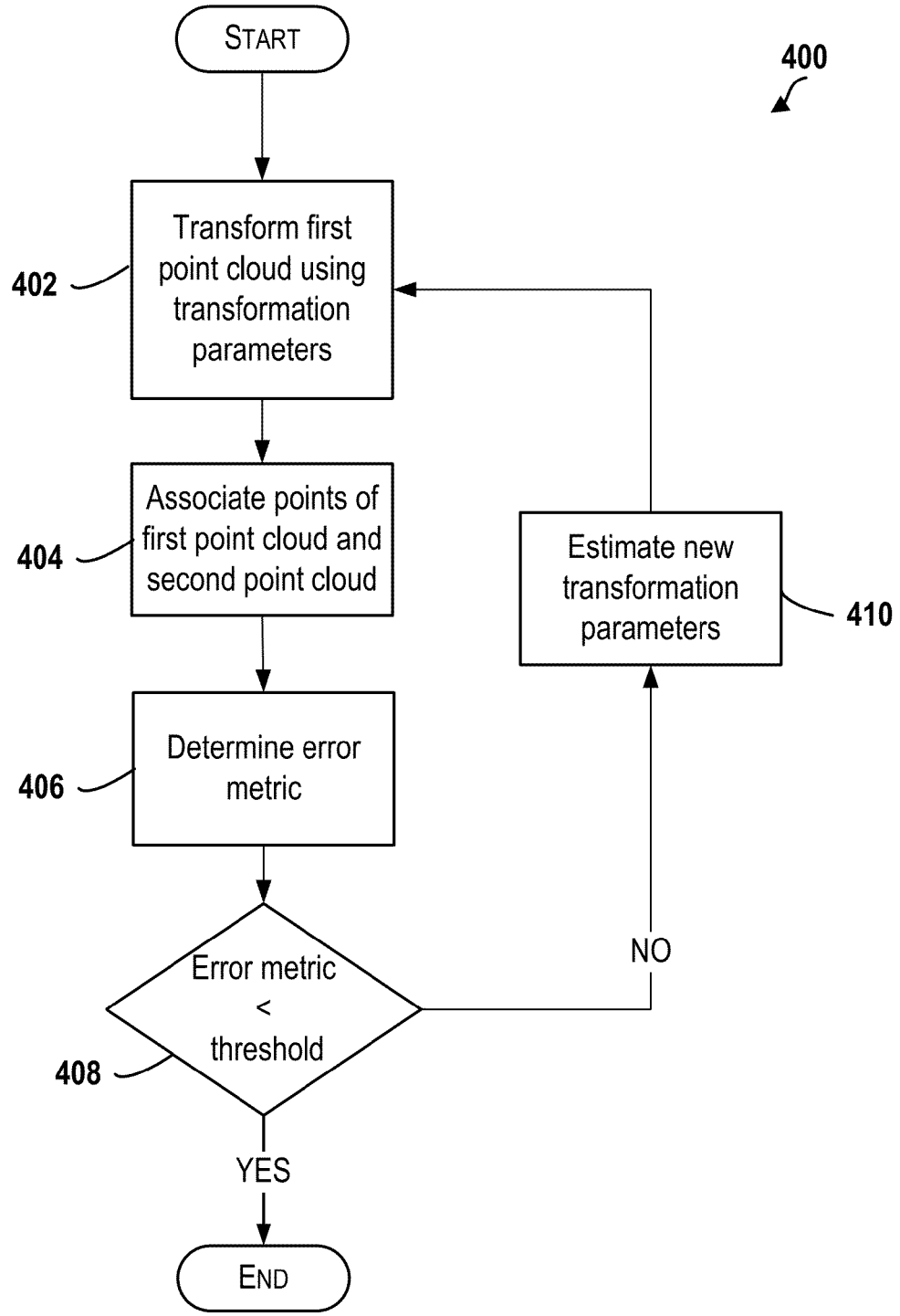
FIG. 4 is a flow chart of an example iterative closest point algorithm.

FIG. 4 is a flow chart of an example ICP algorithm 400. Although FIG. 4 presents one example implementation of an ICP algorithm, other example implementations are also possible. As shown in FIG. 4, initially at block 402 a first point cloud may be transformed using transformation parameters. For example, the transformation parameters may include a translation and/or rotation that attempt to align the first point cloud with points of a second point cloud. In the example of the method 100 of FIG. 1, the transformation parameters may be the initial transformation that is determined based on the estimate of the speed of the target vehicle and the time difference between the first time period and the second time period.

At block 404, points of the transformed first point cloud may be associated with points of the second point cloud. For example, for each point of the transformed first point cloud, a closest point in the second point cloud may be found. The associated points may result in pairs of corresponding points between the transformed first point cloud and second point cloud At block 406, based on the associated points, an error metric may be determined. For example, the error metric may be a mean square error that is determined based on Euclidean distances between each pair of associated points. Therefore, a low error metric may be indicative of a close alignment or registration between the transformed first point cloud and second point cloud while a high error metric may be indicative of an alignment that is less close. Other example error metrics are also possible.

At block 408, a determination may be made whether the error metric determined at block 406 is less than a threshold. If the error metric is less than the threshold, the transformation parameters may be accepted as a solution that aligns the first point cloud with the second point cloud. If, however, the error metric is not less than the threshold, new transformation parameters may be estimated at block 410, and the algorithm 400 may be repeated based on the new transformation parameters.

As a simplified example, at block 410, new transformation parameters may be found that shift the transformed first point cloud in a given direction. If during a subsequent iteration of the algorithm 400 the given direction yields a larger error metric than a previous error metric, new transformation parameters may again be determined that shift the first point cloud in an opposite direction.

Since a vehicle, such as a vehicle that is configured to operate in an autonomous mode, may estimate the heading of one or more target vehicles within a perception range of the vehicle in real-time, in some examples, one or more simplifications may be performed to improve the efficiency of the ICP algorithm. For instance, a size of a point cloud may be reduced by removing points that are outside of a predetermined height range or reducing a density of the point cloud.

Figure 5A:
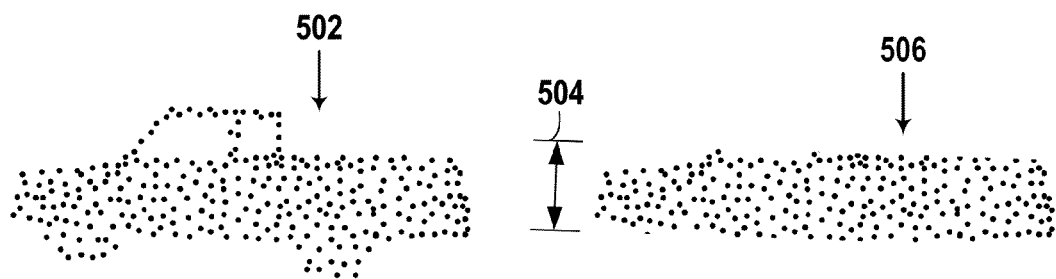
FIG. 5A is an example conceptual illustration of reducing a size of a point cloud.

FIG. 5A is an example conceptual illustration of reducing a size of a point cloud 502. In some examples, a size of a point cloud may be reduced to remove points that are too close or too far from the ground. As shown in FIG. 5A, points of the point cloud 502 identified as a target vehicle that fall outside of a predetermined height range 504 above the ground may be removed from the point cloud 502. Removing points of the point cloud 502 that fall outside of the predetermined height range 504 may yield the reduced point cloud 506. In one example, a predetermined height range is determined such that a strip of points that likely represent the side, front, and/or rear of the target vehicle remain in the reduced point cloud 506. In one instance, the predetermined height range 504 may be a range from about 0.15 meters off of the ground to about 1 meter above the ground. Other example height ranges are also possible.

Figure 5B:
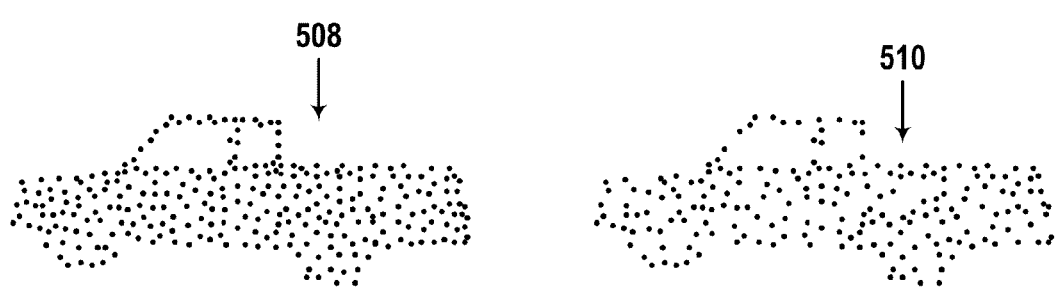
FIG. 5B is an example conceptual illustration of reducing a density of a point cloud.

FIG. 5B is an example conceptual illustration of reducing a density of a point cloud 508. As shown in FIG. 5B, in some examples, a density of the point cloud 508 that is identified as a target vehicle may be controlled by randomly sampling a given number of points from the point cloud 508 to determine a reduced point cloud 510. In one example, for a target vehicle that is identified as a standard size car, 300 sample points may be randomly selected for the reduced point cloud. As another example, for a target vehicle that is identified as a larger vehicle, up to 3000 sample points may be randomly selected to represent the target vehicle.

Systems in which example embodiments of the above example methods may be implemented will now be described in greater detail. In general, an example system may be implemented in or may take the form of a vehicle. The vehicle may take a number of forms, including, for example, automobiles, cars, trucks, motorcycles, buses, boats, airplanes, helicopters, lawn mowers, earth movers, snowmobiles, recreational vehicles, amusement park vehicles, farm equipment, construction equipment, trams, golf carts, trains, and trolleys. Other vehicles are possible as well.

Further, another example system may take the form of non-transitory computer-readable medium, which has program instructions stored thereon that are executable by at least one processor to provide the functionality described herein. An example system may also take the form of a vehicle or a subsystem of a vehicle that includes such a non-transitory computer-readable medium having such program instructions stored thereon.

Figure 6:
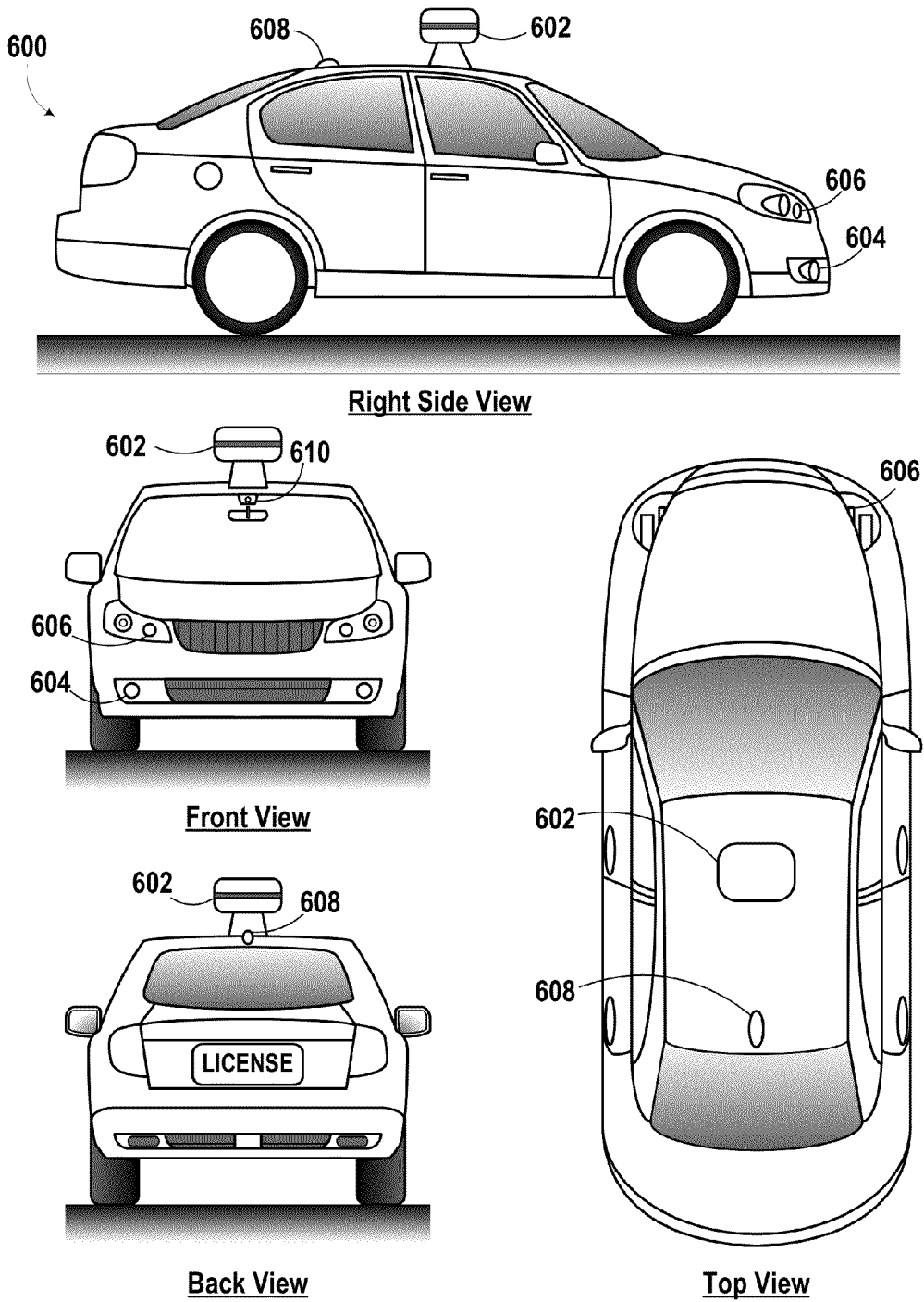
FIG. 6 illustrates an example vehicle, in accordance with an embodiment.

FIG. 6 illustrates an example vehicle 600, in accordance with an embodiment. In particular, FIG. 6 shows a Right Side View, Front View, Back View, and Top View of the vehicle 600. Although vehicle 600 is illustrated in FIG. 6 as a car, other embodiments are possible. For instance, the vehicle 600 could represent a truck, a van, a semi-trailer truck, a motorcycle, a golf cart, an off-road vehicle, or a farm vehicle, among other examples. As shown, the vehicle 600 includes a first sensor unit 602, a second sensor unit 604, a third sensor unit 606, a wireless communication system 608, and a camera 610.

Each of the first, second, and third sensor units 602-606 may include any combination of global positioning system sensors, inertial measurement units, radio detection and ranging (RADAR) units, laser rangefinders, light detection and ranging (LIDAR) units, cameras, and acoustic sensors. Other types of sensors are possible as well.

While the first, second, and third sensor units 602 are shown to be mounted in particular locations on the vehicle 600, in some embodiments the sensor unit 602 may be mounted elsewhere on the vehicle 600, either inside or outside the vehicle 600. Further, while only three sensor units are shown, in some embodiments more or fewer sensor units may be included in the vehicle 600.

In some embodiments, one or more of the first, second, and third sensor units 602-606 may include one or more movable mounts on which the sensors may be movably mounted. The movable mount may include, for example, a rotating platform. Sensors mounted on the rotating platform could be rotated so that the sensors may obtain information from each direction around the vehicle 600. Alternatively or additionally, the movable mount may include a tilting platform. Sensors mounted on the tilting platform could be tilted within a particular range of angles and/or azimuths so that the sensors may obtain information from a variety of angles. The movable mount may take other forms as well.

Further, in some embodiments, one or more of the first, second, and third sensor units 602-606 may include one or more actuators configured to adjust the position and/or orientation of sensors in the sensor unit by moving the sensors and/or movable mounts. Example actuators include motors, pneumatic actuators, hydraulic pistons, relays, solenoids, and piezoelectric actuators. Other actuators are possible as well.

The wireless communication system 608 may be any system configured to wirelessly couple to one or more other vehicles, sensors, or other entities, either directly or via a communication network. To this end, the wireless communication system 608 may include an antenna and a chipset for communicating with the other vehicles, sensors, or other entities either directly or via a communication network. The chipset or wireless communication system 608 in general may be arranged to communicate according to one or more other types of wireless communication (e.g., protocols) such as Bluetooth, communication protocols described in IEEE 802.11 (including any IEEE 802.11 revisions), cellular technology (such as GSM, CDMA, UMTS, EV-DO, WiMAX, or LTE), Zigbee, dedicated short range communications (DSRC), and radio frequency identification (RFID) communications, among other possibilities. The wireless communication system 608 may take other forms as well.

While the wireless communication system 608 is shown positioned on a roof of the vehicle 600, in other embodiments the wireless communication system 608 could be located, fully or in part, elsewhere.

The camera 610 may be any camera (e.g., a still camera, a video camera, etc.) configured to capture images of the environment in which the vehicle 600 is located. To this end, the camera 610 may be configured to detect visible light, or may be configured to detect light from other portions of the spectrum, such as infrared or ultraviolet light. Other types of cameras are possible as well. The camera 610 may be a two-dimensional detector, or may have a three-dimensional spatial range. In some embodiments, the camera 610 may be, for example, a range detector configured to generate a two-dimensional image indicating a distance from the camera 610 to a number of points in the environment. To this end, the camera 610 may use one or more range detecting techniques. For example, the camera 610 may use a structured light technique in which the vehicle 600 illuminates an object in the environment with a predetermined light pattern, such as a grid or checkerboard pattern and uses the camera 610 to detect a reflection of the predetermined light pattern off the object. Based on distortions in the reflected light pattern, the vehicle 600 may determine the distance to the points on the object. The predetermined light pattern may comprise infrared light, or light of another wavelength. As another example, the camera 610 may use a laser scanning technique in which the vehicle 600 emits a laser and scans across a number of points on an object in the environment. While scanning the object, the vehicle 600 uses the camera 610 to detect a reflection of the laser off the object for each point. Based on a length of time it takes the laser to reflect off the object at each point, the vehicle 600 may determine the distance to the points on the object. As yet another example, the camera 610 may use a time-of-flight technique in which the vehicle 600 emits a light pulse and uses the camera 610 to detect a reflection of the light pulse off an object at a number of points on the object. In particular, the camera 610 may include a number of pixels, and each pixel may detect the reflection of the light pulse from a point on the object. Based on a length of time it takes the light pulse to reflect off the object at each point, the vehicle 600 may determine the distance to the points on the object. The light pulse may be a laser pulse. Other range detecting techniques are possible as well, including stereo triangulation, sheet-of-light triangulation, interferometry, and coded aperture techniques, among others. The camera 610 may take other forms as well.

In some embodiments, the camera 610 may include a movable mount and/or an actuator, as described above, that are configured to adjust the position and/or orientation of the camera 610 by moving the camera 610 and/or the movable mount.

While the camera 610 is shown to be mounted inside a front windshield of the vehicle 600, in other embodiments the camera 610 may be mounted elsewhere on the vehicle 600, either inside or outside the vehicle 600.

The vehicle 600 may include one or more other components in addition to or instead of those shown.

Figure 7:
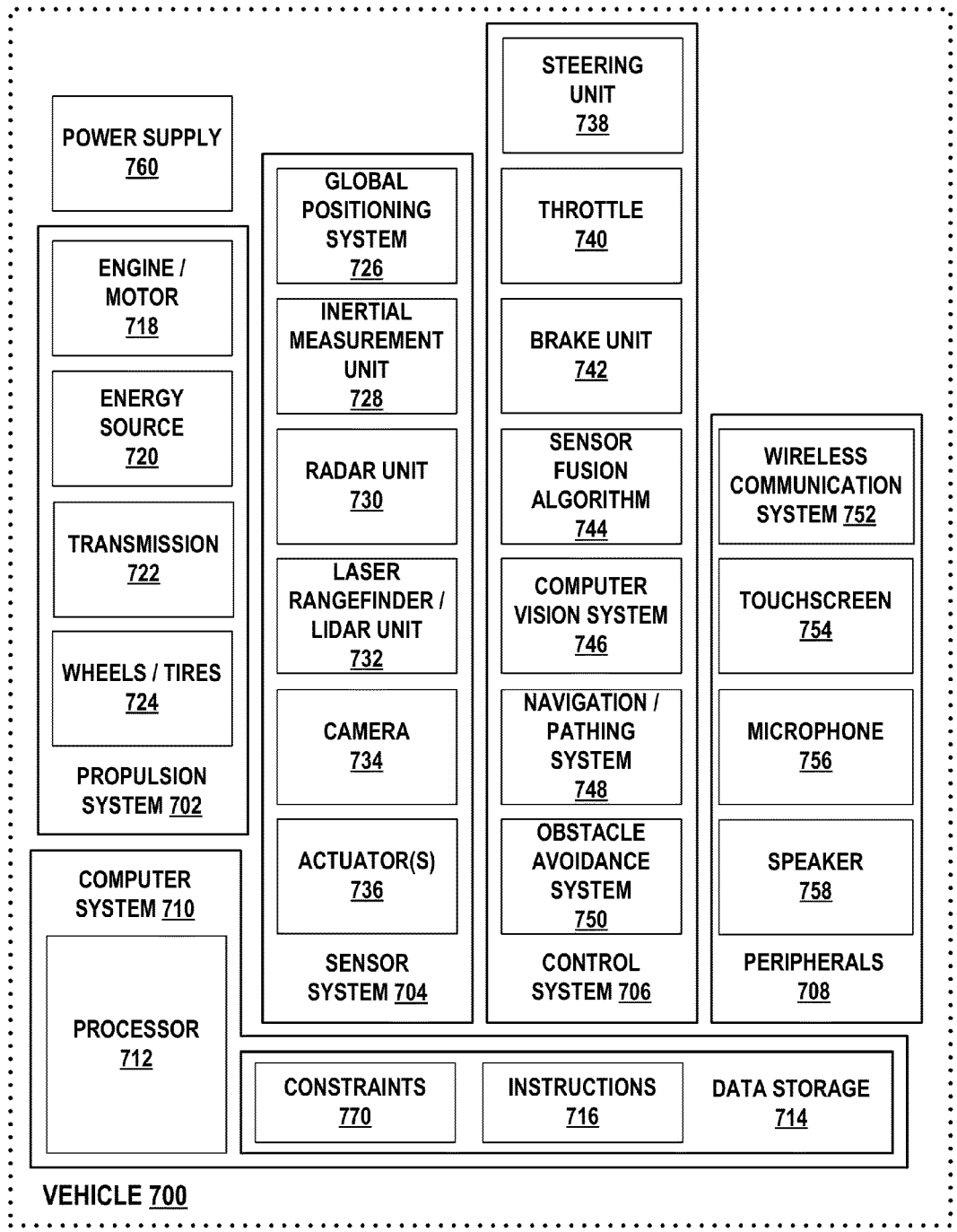
FIG. 7 is a simplified block diagram of an example vehicle, in accordance with an embodiment.

FIG. 7 is a simplified block diagram of an example vehicle 700, in accordance with an embodiment. The vehicle 700 may, for example, be similar to the vehicle 600 described above in connection with FIG. 6. The vehicle 700 may take other forms as well.

As shown, the vehicle 700 includes a propulsion system 702, a sensor system 704, a control system 706, peripherals 708, and a computer system 710 including a processor 712, data storage 714, and instructions 716. In other embodiments, the vehicle 700 may include more, fewer, or different systems, and each system may include more, fewer, or different components. Additionally, the systems and components shown may be combined or divided in any number of ways.

The propulsion system 702 may be configured to provide powered motion for the vehicle 700. As shown, the propulsion system 702 includes an engine/motor 718, an energy source 720, a transmission 722, and wheels/tires 724.

The engine/motor 718 may be or include any combination of an internal combustion engine, an electric motor, a steam engine, and a Stirling engine. Other motors and engines are possible as well. In some embodiments, the propulsion system 702 could include multiple types of engines and/or motors. For instance, a gas-electric hybrid car could include a gasoline engine and an electric motor. Other examples are possible.

The energy source 720 may be a source of energy that powers the engine/motor 718 in full or in part. That is, the engine/motor 718 may be configured to convert the energy source 720 into mechanical energy. Examples of energy sources 720 include gasoline, diesel, propane, other compressed gas-based fuels, ethanol, solar panels, batteries, and other sources of electrical power. The energy source(s) 720 could additionally or alternatively include any combination of fuel tanks, batteries, capacitors, and/or flywheels. In some embodiments, the energy source 720 may provide energy for other systems of the vehicle 700 as well.

The transmission 722 may be configured to transmit mechanical power from the engine/motor 718 to the wheels/tires 724. To this end, the transmission 722 may include a gearbox, clutch, differential, drive shafts, and/or other elements. In embodiments where the transmission 722 includes drive shafts, the drive shafts could include one or more axles that are configured to be coupled to the wheels/tires 724.

The wheels/tires 724 of vehicle 700 could be configured in various formats, including a unicycle, bicycle/motorcycle, tricycle, or car/truck four-wheel format. Other wheel/tire formats are possible as well, such as those including six or more wheels. In any case, the wheels/tires 724 of vehicle 724 may be configured to rotate differentially with respect to other wheels/tires 724. In some embodiments, the wheels/tires 724 may include at least one wheel that is fixedly attached to the transmission 722 and at least one tire coupled to a rim of the wheel that could make contact with the driving surface. The wheels/tires 724 may include any combination of metal and rubber, or combination of other materials.

The propulsion system 702 may additionally or alternatively include components other than those shown.

The sensor system 704 may include a number of sensors configured to sense information about an environment in which the vehicle 700 is located, as well as one or more actuators 736 configured to modify a position and/or orientation of the sensors. As shown, the sensors of the sensor system 704 include a Global Positioning System (GPS) 726, an inertial measurement unit (IMU) 728, a RADAR unit 730, a laser rangefinder and/or LIDAR unit 732, and a camera 734. The sensor system 704 may include additional sensors as well, including, for example, sensors that monitor internal systems of the vehicle 700 (e.g., an $O_2$ monitor, a fuel gauge, an engine oil temperature, etc.). Other sensors are possible as well.

The GPS 726 may be any sensor configured to estimate a geographic location of the vehicle 700. To this end, the GPS 726 may include a transceiver configured to estimate a position of the vehicle 700 with respect to the Earth. The GPS 726 may take other forms as well.

The IMU 728 may be any combination of sensors configured to sense position and orientation changes of the vehicle 700 based on inertial acceleration. In some embodiments, the combination of sensors may include, for example, accelerometers and gyroscopes. Other combinations of sensors are possible as well.

The RADAR 730 unit may be any sensor configured to sense objects in the environment in which the vehicle 700 is located using radio signals. In some embodiments, in addition to sensing the objects, the RADAR unit 730 may additionally be configured to sense the speed and/or heading of the objects.

Similarly, the laser rangefinder or LIDAR unit 732 may be any sensor configured to sense objects in the environment in which the vehicle 700 is located using lasers. In particular, the laser rangefinder or LIDAR unit 732 may include a laser source and/or laser scanner configured to emit a laser and a detector configured to detect reflections of the laser. The laser rangefinder or LIDAR 732 may be configured to operate in a coherent (e.g., using heterodyne detection) or an incoherent detection mode.

The camera 734 may be any camera (e.g., a still camera, a video camera, etc.) configured to capture images of the environment in which the vehicle 700 is located. To this end, the camera may take any of the forms described above.

The sensor system 704 may additionally or alternatively include components other than those shown.

The control system 706 may be configured to control operation of the vehicle 700 and its components. To this end, the control system 706 may include a steering unit 738, a throttle 740, a brake unit 742, a sensor fusion algorithm 744, a computer vision system 746, a navigation or pathing system 748, and an obstacle avoidance system 750.

The steering unit 738 may be any combination of mechanisms configured to adjust the heading of vehicle 700.

The throttle 740 may be any combination of mechanisms configured to control the operating speed of the engine/motor 718 and, in turn, the speed of the vehicle 700.

The brake unit 742 may be any combination of mechanisms configured to decelerate the vehicle 700. For example, the brake unit 742 may use friction to slow the wheels/tires 724. As another example, the brake unit 742 may convert the kinetic energy of the wheels/tires 724 to electric current. The brake unit 742 may take other forms as well.

The sensor fusion algorithm 744 may be an algorithm (or a computer program product storing an algorithm) configured to accept data from the sensor system 704 as an input. The data may include, for example, data representing information sensed at the sensors of the sensor system 704. The sensor fusion algorithm 744 may include, for example, a Kalman filter, a Bayesian network, or another algorithm. The sensor fusion algorithm 744 may further be configured to provide various assessments based on the data from the sensor system 704, including, for example, evaluations of individual objects and/or features in the environment in which the vehicle 700 is located, evaluations of particular situations, and/or evaluations of possible impacts based on particular situations. Other assessments are possible as well.

The computer vision system 746 may be any system configured to process and analyze images captured by the camera 734 in order to identify objects and/or features in the environment in which the vehicle 700 is located, including, for example, traffic signals and obstacles. To this end, the computer vision system 746 may use an object recognition algorithm, a Structure from Motion (SFM) algorithm, video tracking, or other computer vision techniques. In some embodiments, the computer vision system 746 may additionally be configured to map the environment, track objects, estimate the speed of objects, etc.

The navigation and pathing system 748 may be any system configured to determine a driving path for the vehicle 700. The navigation and pathing system 748 may additionally be configured to update the driving path dynamically while the vehicle 700 is in operation. In some embodiments, the navigation and pathing system 748 may be configured to incorporate data from the sensor fusion algorithm 744, the GPS 726, and one or more predetermined maps so as to determine the driving path for vehicle 100.

The obstacle avoidance system 750 may be any system configured to identify, evaluate, and avoid or otherwise negotiate obstacles in the environment in which the vehicle 700 is located.

The control system 706 may additionally or alternatively include components other than those shown.

Peripherals 708 may be configured to allow the vehicle 700 to interact with external sensors, other vehicles, and/or a user. To this end, the peripherals 708 may include, for example, a wireless communication system 752, a touchscreen 754, a microphone 756, and/or a speaker 758.

The wireless communication system 752 may take any of the forms described above.

The touchscreen 754 may be used by a user to input commands to the vehicle 700. To this end, the touchscreen 754 may be configured to sense at least one of a position and a movement of a user's finger via capacitive sensing, resistance sensing, or a surface acoustic wave process, among other possibilities. The touchscreen 754 may be capable of sensing finger movement in a direction parallel or planar to the touchscreen surface, in a direction normal to the touchscreen surface, or both, and may also be capable of sensing a level of pressure applied to the touchscreen surface. The touchscreen 754 may be formed of one or more translucent or transparent insulating layers and one or more translucent or transparent conducting layers. The touchscreen 754 may take other forms as well.

The microphone 756 may be configured to receive audio (e.g., a voice command or other audio input) from a user of the vehicle 700. Similarly, the speakers 758 may be configured to output audio to the user of the vehicle 700.

The peripherals 708 may additionally or alternatively include components other than those shown.

The computer system 710 may be configured to transmit data to and receive data from one or more of the propulsion system 702, the sensor system 704, the control system 706, and the peripherals 708. To this end, the computer system 710 may be communicatively linked to one or more of the propulsion system 702, the sensor system 704, the control system 706, and the peripherals 708 by a system bus, network, and/or other connection mechanism (not shown).

The computer system 710 may be further configured to interact with and control one or more components of the propulsion system 702, the sensor system 704, the control system 706, and/or the peripherals 708. For example, the computer system 710 may be configured to control operation of the transmission 722 to improve fuel efficiency. As another example, the computer system 710 may be configured to cause the camera 734 to capture images of the environment. As yet another example, the computer system 710 may be configured to store and execute instructions corresponding to the sensor fusion algorithm 744. As still another example, the computer system 710 may be configured to store and execute instructions for displaying a display on the touchscreen 754. Other examples are possible as well.

As shown, the computer system 710 includes the processor 712 and data storage 714. The processor 712 may comprise one or more general-purpose processors and/or one or more special-purpose processors. To the extent the processor 712 includes more than one processor, such processors could work separately or in combination. Data storage 714, in turn, may comprise one or more volatile and/or one or more non-volatile storage components, such as optical, magnetic, and/or organic storage, and data storage 714 may be integrated in whole or in part with the processor 712.

In some embodiments, data storage 714 may contain instructions 716 (e.g., program logic) executable by the processor 712 to execute various vehicle functions, including those described above in connection with FIG. 1. Further, data storage 714 may contain constraints 770 for the vehicle 700, which may take any of the forms described above. Data storage 714 may contain additional instructions as well, including instructions to transmit data to, receive data from, interact with, and/or control one or more of the propulsion system 702, the sensor system 704, the control system 706, and the peripherals 708.

The computer system 702 may additionally or alternatively include components other than those shown.

As shown, the vehicle 700 further includes a power supply 760, which may be configured to provide power to some or all of the components of the vehicle 700. To this end, the power supply 760 may include, for example, a rechargeable lithium-ion or lead-acid battery. In some embodiments, one or more banks of batteries could be configured to provide electrical power. Other power supply materials and configurations are possible as well. In some embodiments, the power supply 760 and energy source 720 may be implemented together, as in some all-electric cars.

In some embodiments, one or more of the propulsion system 702, the sensor system 704, the control system 706, and the peripherals 708 could be configured to work in an interconnected fashion with other components within and/or outside their respective systems.

Further, the vehicle 700 may include one or more elements in addition to or instead of those shown. For example, the vehicle 700 may include one or more additional interfaces and/or power supplies. Other additional components are possible as well. In such embodiments, data storage 714 may further include instructions executable by the processor 712 to control and/or communicate with the additional components.

Still further, while each of the components and systems are shown to be integrated in the vehicle 700, in some embodiments, one or more components or systems may be removably mounted on or otherwise connected (mechanically or electrically) to the vehicle 700 using wired or wireless connections.

The vehicle 700 may take other forms as well.

In some embodiments, the disclosed methods may be implemented as computer program instructions encoded on a non-transitory computer-readable storage media in a machine-readable format, or on other non-transitory media or articles of manufacture. FIG. 8 is a schematic illustrating a conceptual partial view of an example computer program product 800 that includes a computer program for executing a computer process on a computing device, arranged according to at least some embodiments presented herein.

In one embodiment, the example computer program product 800 is provided using a signal bearing medium 802. The signal bearing medium 802 may include one or more programming instructions 804 that, when executed by one or more processors, may provide functionality or portions of the functionality described above with respect to FIGS. 1-7.

In some embodiments, the signal bearing medium 802 may encompass a computer-readable medium 806, such as, but not limited to, a hard disk drive, a Compact Disc (CD), a Digital Video Disk (DVD), a digital tape, memory, etc. Further, in some embodiments the signal bearing medium 802 may encompass a computer recordable medium 808, such as, but not limited to, memory, read/write (R/W) CDs, R/W DVDs, etc. Still further, in some embodiments the signal bearing medium 802 may encompass a communications medium 810, such as, but not limited to, a digital and/or an analog communication medium (e.g., a fiber optic cable, a waveguide, a wired communications link, a wireless communication link, etc.). Thus, for example, the signal bearing medium 802 may be conveyed by a wireless form of the communications medium 810.

The one or more programming instructions 804 may be, for example, computer executable and/or logic implemented instructions. In some examples, a computing system such as the computing system 710 of FIG. 7 may be configured to provide various operations, functions, or actions in response to the programming instructions 804 being conveyed to the computing system 710 by one or more of the computer readable medium 806, the computer recordable medium 808, and/or the communications medium 810.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunctions with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
   determining a first point cloud representative of a location of a target vehicle at a first time period;
   determining a second point cloud representative of the location of the target vehicle at a second time period;
   determining, using a computing device, an initial comparison between the first point cloud and the second point cloud based on an estimate of a speed for the target vehicle and a time difference between the first time period and the second time period;
   revising, using the computing device, the initial comparison based on a minimization of a distance between points of the first point cloud and corresponding points of the second point cloud;
   determining, using the computing device, an estimate of a heading of the target vehicle based on the revised comparison; and
   controlling another vehicle based on the determined estimate of the heading of the target vehicle.

2. The method of claim 1, further comprising determining the initial comparison between the first point cloud and the second point cloud based on the estimate of the speed for the target vehicle, the time difference, and a prior estimate of the heading of the target vehicle.

3. The method of claim 1, wherein the other vehicle is configured to operate in an autonomous mode.

4. The method of claim 1, wherein determining the first point cloud and determining the second point cloud comprises performing a laser scan at a fixed time interval, wherein the time difference is determined based on the fixed time interval.

5. The method of claim 1, further comprising revising the initial comparison using iterative closest point (ICP).

6. The method of claim 1, further comprising reducing a size of the first point cloud and the second point cloud by removing points of the first point cloud and the second point cloud that are outside of a predetermined height range.

7. The method of claim 1, further comprising reducing a density of the first point cloud and the second point cloud by randomly sampling points of the first point cloud and the second point cloud and selecting the randomly sampled points as representations of the first point cloud and the second point cloud.

8. The method of claim 1, wherein determining the estimate of the heading of the target vehicle based on the revised comparison comprises:
   determining an offset between the first point cloud and the second point cloud, wherein the offset comprises a three-dimensional (3D) vector; and
   determining the estimate of the heading of the target vehicle based on an inverse tangent of the offset along a ground plane, wherein the ground plane is an approximation of a two-dimensional plane that the target vehicle travels on.

9. A non-transitory computer-readable medium having stored therein instructions executable by a computing device to cause the computing device to perform functions comprising:
   determining a first point cloud representative of a location of a target vehicle at a first time period;
   determining a second point cloud representative of the location of the target vehicle at a second time period;
   determining an initial comparison between the first point cloud and the second point cloud based on an estimate of a speed for the target vehicle and a time difference between the first time period and the second time period;
   revising the initial comparison based on a minimization of a distance between points of the first point cloud and corresponding points of the second point cloud;
   determining an estimate of a heading of the target vehicle based on the revised comparison; and
   controlling another vehicle based on the determined estimate of the heading of the target vehicle.

10. The non-transitory computer-readable medium of claim 9, wherein the functions further comprise determining the initial comparison between the first point cloud and the second point cloud based on the estimate of the speed for the target vehicle, the time difference, and a prior estimate of the heading of the target vehicle.

11. The non-transitory computer-readable medium of claim 9, wherein determining the first point cloud and determining the second point cloud comprises performing a laser scan at a fixed time interval, wherein the time difference is determined based on the fixed time interval.

12. The non-transitory computer-readable medium of claim 9, wherein the functions further comprise reducing a size of the first point cloud and the second point cloud by removing points of the first point cloud and the second point cloud that are outside of a predetermined height range.

13. The non-transitory computer-readable medium of claim 9, wherein the functions further comprise reducing a density of the first point cloud and the second point cloud by randomly sampling points of the first point cloud and the second point cloud and selecting the randomly sampled points as representations of the first point cloud and the second point cloud.

14. The non-transitory computer-readable medium of claim 9, wherein determining the estimate of the heading of the target vehicle based on the revised comparison comprises:
   determining an offset between the first point cloud and the second point cloud, wherein the offset comprises a three-dimensional (3D) vector; and determining the estimate of the heading of the target vehicle based on an inverse tangent of the offset along a ground plane, wherein the ground plane is an approximation of a two-dimensional plane that the target vehicle travels on.

15. A controller comprising:

at least one processor;

a memory; and instructions stored in the memory and executable by the at least one processor to cause the controller to perform functions comprising:

determining a first point cloud representative of a location of a target vehicle at a first time period;

determining a second point cloud representative of the location of the target vehicle at a second time period;

determining an initial comparison between the first point cloud and the second point cloud based on an estimate of a speed for the target vehicle and a time difference between the first time period and the second time period;

revising the initial comparison based on a minimization of a distance between points of the first point cloud and corresponding points of the second point cloud;

determining an estimate of a heading of the target vehicle based on the revised comparison; and controlling another vehicle based on the determined estimate of the heading of the target vehicle.

16. The controller of claim 15, wherein the functions further comprise determining the initial comparison between the first point cloud and the second point cloud based on the estimate of the speed for the target vehicle, the time difference, and a prior estimate of the heading of the target vehicle.

17. The controller of claim 15, wherein determining the first point cloud and determining the second point cloud comprises performing a laser scan at a fixed time interval, wherein the time difference is determined based on the fixed time interval.

18. The controller of claim 15, wherein the functions further comprise reducing a size of the first point cloud and the second point cloud by removing points of the first point cloud and the second point cloud that are outside of a predetermined height range.

19. The controller of claim 15, wherein the functions further comprise reducing a density of the first point cloud and the second point cloud by randomly sampling points of the first point cloud and the second point cloud and selecting the randomly sampled points as representations of the first point cloud and the second point cloud.

20. The controller of claim 15, wherein the other vehicle is configured to operate in an autonomous mode.

\* \* \* \* \*